April 19, 1960     A. B. MOULTON ET AL     2,933,682

FREQUENCY MEASURING APPARATUS

Filed March 5, 1956                            2 Sheets-Sheet 1

*INVENTORS*
*ARTHUR B. MOULTON*
*& JOSEPH A. WEBB*
BY
*ATTORNEY*

INVENTORS
ARTHUR B. MOULTON
& JOSEPH A. WEBB

United States Patent Office 2,933,682
Patented Apr. 19, 1960

2,933,682

FREQUENCY MEASURING APPARATUS

Arthur B. Moulton, San Diego, and Joseph A. Webb, La Mesa, Calif., assignors to General Dynamics Corporation, San Diego, Calif., a corporation of Delaware Application March 5, 1956, Serial No. 569,307

6 Claims. (Cl. 324—79)

This invention relates to electrical measuring apparatus, and, more particularly, to apparatus for measuring a difference in frequency between two alternating voltages.

In many applications of alternating current electricity it is necessary to accurately determine the amount and direction of a change of frequency of an alternating voltage with respect to an alternating voltage of standard frequency. Exemplarily, the frequency of alternators at central power stations must be closely maintained to enable interconnection of alternators and provide the proper alternating current to the load. The assigned carrier frequency of radio-frequency oscillators employed in radio and television broadcast transmitters are required to be maintained to very close tolerances. Frequency meters, frequently checked against a standard frequency source, are presently employed to indicate the frequency of operation and the necessity for frequency adjustment.

Radar systems of the continuous wave type measure the frequency difference between the transmitted signal and the received signal reflected from the target. The relative velocity between the radar system and the target is determined by measuring the Doppler frequency shift between the transmitted and received signal by determining the beat frequency between the transmitted and received signals by means of a frequency meter.

Frequency meters heretofore known to the art have an inherently limited useable frequency range. Tuned vibratory reeds may be used only at power frequencies. Electrical tuned circuits and piezo-electric devices are employed in various types of frequency meters. By employing tuned circuits, the frequency range may be extended somewhat, but is still limited. In addition these tuned devices are inherently sensitive to amplitude differences between the test signal and the standard, and to variations in amplitude of the test signal. Furthermore, it is frequently desirable to provide a digital pulse indication of frequency difference for telemetering purposes.

The frequency measuring device of this invention measures the difference in frequency between the signal provided by a standard frequency source and the test signal. In a preferred embodiment of this invention, the standard signal and the test signal are applied to a first balanced modulator, and the standard signal, shifted in phase by 90 degrees is applied to a second balanced modulator, together with the test signal. A pair of low-pass filter circuits select the desired output signals from each modulator which are applied to trigger circuits providing square wave signals. These square waves are applied to selected ones of a group of "and," or coincidence gates, and also to differentiating circuits. The differentiating circuits produce impulses in response to the square waves. The "and" gates are also connected to the differentiating circuits in such a manner that the coincidence of a positive portion of a square wave and a positive pulse produces an output pulse. Output impulses from the gate circuits are obtained on one of two lines. A first output line provides an impulse every time the test signal advances 90 degrees in phase ahead of the standard signal and a second output line provides an impulse every time the test signal lags 90 degrees in phase behind the standard signal. By providing means for counting the output impulses for an appropriate period of time, a numerical indication may be obtained of difference of frequency within a quarter of a cycle, and of the sense of frequency difference. Provision of a conventional bidirectional counter integrates the number of quarter-cycles of frequency difference. Employment of suitable control means, well-known to the art, enables the test signal to be maintained at the frequency of the standard signal within a quarter of a cycle, thereby automatically averaging out the frequency changes of the test signal above and below the standard signal. The impulses may be transmitted to a remote point for monitoring or telemetering purposes.

Since operation of the circuit herein disclosed does not depend upon frequency sensitive tuned circuits, it will be apparent that any of a broad band of frequencies may be measured in a simple manner. Variations of signal voltage do not affect the accuracy of this invention as other frequency measuring devices are affected, due to the pulse digital mode of operation.

In an embodiment of this invention adapted for employment at microwave frequencies, as in conjunction with a continuous wave radar system, the modulators employed therein may be of the waveguide type, or, alternatively, both signals may be reduced in frequency by beating with the same oscillator and applying the two beat frequencies to the frequency measuring device of this invention.

It is, therefore, an object of this invention to provide an improved frequency measuring device having a broad frequency range.

A further object of this invention is to provide an improved frequency measuring device which does not require sharply tuned circuits.

A further object of this invention is to provide an improved frequency measuring device which is insensitive to signal voltage variations.

A further object of this invention is to provide an improved frequency measuring device providing a digital indication of frequency difference and the direction thereof.

A further object of this invention is to provide an improved frequency measuring device which is accurate, simple to operate, and inexpensive to manufacture.

These and other objects and advantages will become apparent to one skilled in the art from the following description of this invention taken in connection with the accompanying drawings wherein.

Figure 1:
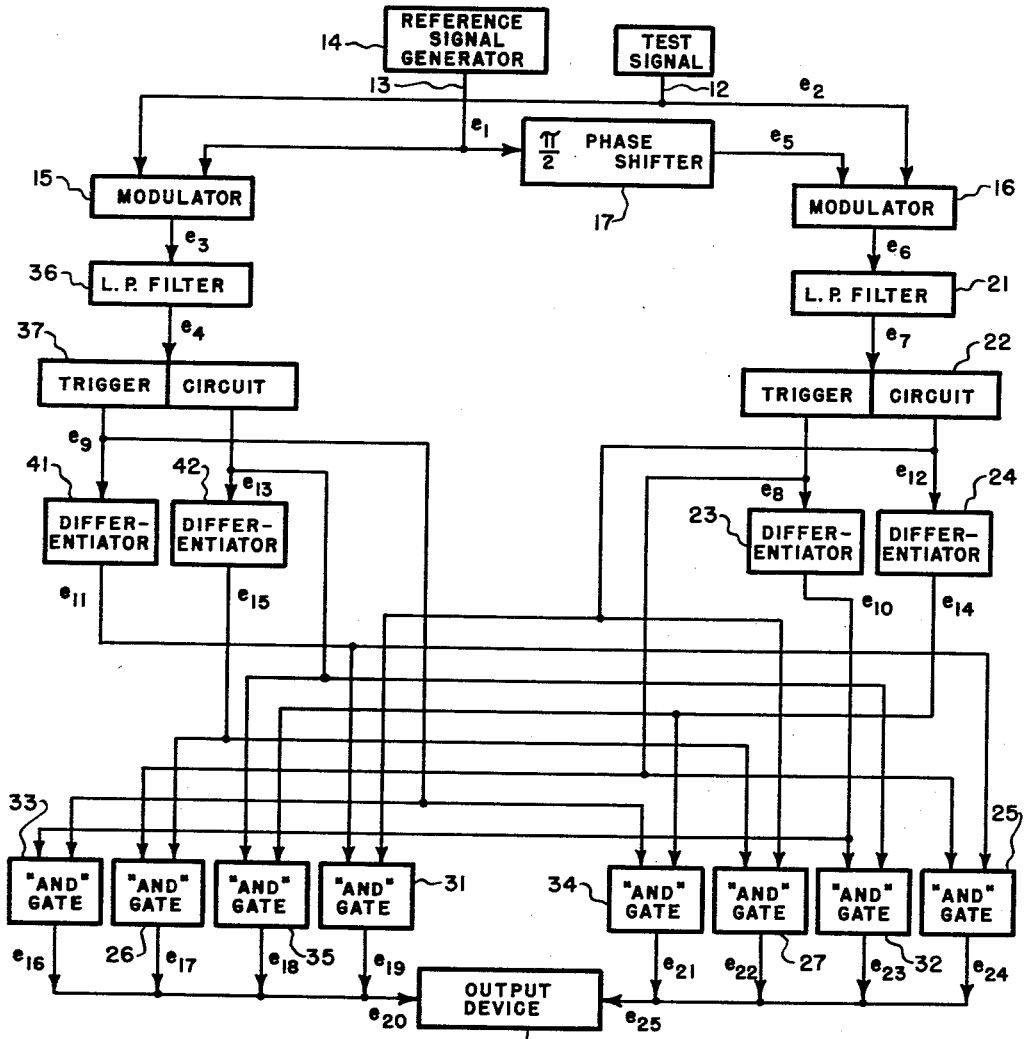
Figure 1 is a block diagram of a presently preferred embodiment of this invention.

Referring now to Figure 1, an alternating voltage of unknown frequency is applied to input conductor 12. A reference alternating voltage of known frequency is applied to input terminal 13 by a suitable signal generator 14. The unknown frequency signal is applied directly to a first input terminal of modulator 15 and to a first input terminal of modulator 16. The signal of known frequency from signal generator 14 is applied directly to another input terminal of modulator 15, and to phase shifter 17. Phase shifter 17 may be of any suitable type well-known to the art capable of providing a 90 degree phase shift, such as a resistor-capacitor network, a delay line, or an inductive or capacitive phase shifter. The phase-shifted standard frequency signal from phase shifter 17 is applied to the other input terminal of modulator 16. The output signal from modulator 16 is applied to a low-pass filter 21. Low-pass filter 21 selects the desired component of the output signal from modulator 16, as will be further disclosed hereinbelow, and applies the selected output signal component to a trigger circuit 22.

Trigger circuit 22 may conveniently comprise a bistable Eccles-Jordan trigger circuit, of a type well-known to those skilled in the art. Trigger circuit 22 serves to convert the alternating voltage from low-pass filter 22 into a square wave signal of the same frequency as that furnished by filter circuit 21. As is well-known to those skilled in the art, such Eccles-Jordan trigger circuits comprise a pair of electron discharge devices, only one of which may be in the conducting condition at a time. Trigger circuit 22 is provided with two output conductors, one associated with each electron discharge device.

Differentiator 23 is connected to a first output conductor from trigger circuit 22, and differentiator 24 is connected to the second output conductor from trigger circuit 22. In addition to differentiator 23, the first output conductor from trigger circuit 22 is connected to coincidence, or "and" gates 25 and 26. Similarly, the second output conductor from trigger circuit 22 is also connected to "and" gates 27 and 31. The impulse output signal from differentiator 23 is applied to "and" gates 32 and 33, while the impulse output signal from differentiator 24 is connected to "and" gates 34 and 35.

The output signal from modulator 15 is applied to a low-pass filter 36, similar to low-pass filter 21. Trigger circuit 37, similar to trigger circuit 22, is connected to low-pass filter 36. A first output conductor from trigger circuit 37 is connected to differentiator 41 and a second output conductor is connected to differentiator 42. Differentiator circuits 41 and 42 are similar to differentiators 23 and 24.

The first output conductor from trigger circuit 37 is connected to "and" gates 33 and 34, in addition to differentiator 41. Similarly, the second output conductor from trigger circuit 37 is connected to "and" gates 32 and 35, in addition to differentiator 42. The differentiated output signal from differentiator 41 is applied to "and" gates 25 and 31, while the differentiated output signal from differentiator 42 is applied to "and" gates 26 and 27. Output conductors from "and" gates 25, 27, 32 and 34 are connected in parallel and attached to an output device 43. Similarly, output conductors from "and" gates 26, 31, 33 and 35 are also connected in parallel and attached to output device 43.

Figure 2:
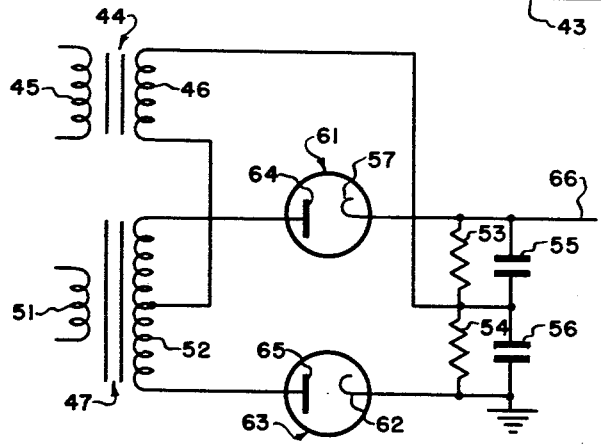
Figure 2 is a schematic circuit diagram of a modulator which is employed in the embodiment of this invention illustrated in Figure 1.

Modulators 15 and 16 may be any suitable type known to the art. However, the untuned modulator illustrated by Figure 2 is presently preferred in the hereindisclosed embodiment of this invention, since it will operate over a broad band of frequencies.

A first input transformer 44 has a primary winding 45 and a secondary winding 46. Second input transformer 47 has a primary winding 51 and a secondary winding 52. Primary winding 45 of transformer 44 may be connected to the signal of unknown frequency. Secondary winding 46 has one end connected to a center tap of secondary winding 52 of transformer 47, and the other end connected to the junction of serially connected resistors 53 and 54, and capacitors 55 and 56, connected in parallel with resistors 53 and 54, respectively. Capacitor 55 and resistor 53 are also connected to cathode 57 of diode 61, and capacitor 56 and resistor 54 are similarly connected to cathode 62 of diode 63.

The other input signal to the modulators may be the reference frequency signal provided by reference signal generator 14 directly, or shifted in phase by 90 degrees, applied respectively to modulator 15 and modulator 16. This signal is applied to primary winding 51 of transformer 47. One end of secondary winding 52 is connected to anode 64 of diode 61, while the other end of winding 52 is connected to anode 65 of diode 63. The modulated output signal, appearing on conductor 66, is applied to the low-pass filter 21 or 36 corresponding to modulators 16 or 15, respectively.

The reference signal applied to primary winding 51 of transformer 47 is furnished to anodes 64 and 65 of diodes 61 and 63 simultaneously and 180 degrees out of phase. Thus, anode 64 will be going positive in polarity while anode 65 is going negative. On the other hand, the unknown signal connected to primary winding 45 of transformer 44 is applied to anodes 64 and 65 in the same phase. The output voltage of such a balanced modulator, assuming the circuit is symmetrical and diodes 61 and 63 are identical, contains only the product of the two input voltages. A complete description of such a balanced modulator is contained on pages 325 and 326 of "Electron Tube Circuits" by Samuel Seely, published 1950 by McGraw-Hill Book Company. As generally disclosed in this publication, the reference voltage is of the form $e_1 = E_1 \sin \omega_1 t$, and the unknown voltage is of the form $e_2 = E_2 \sin \omega_2 t$.

The reference voltage $e_1$ and the unknown signal $e_2$ are applied directly to modulator 15. The output signal $e_3$ from modulator 15 is the product of the two input signals. Thus, $$e_3 = e_1 e_2 = (E_1 \sin \omega_1 t)(E_2 \sin \omega_2 t)$$
$$= \frac{E_1 E_2}{2} \{[\cos (\omega_1 t - \omega_2 t)] - [\cos (\omega_1 t + \omega_2 t)]\}$$

Figure 3:
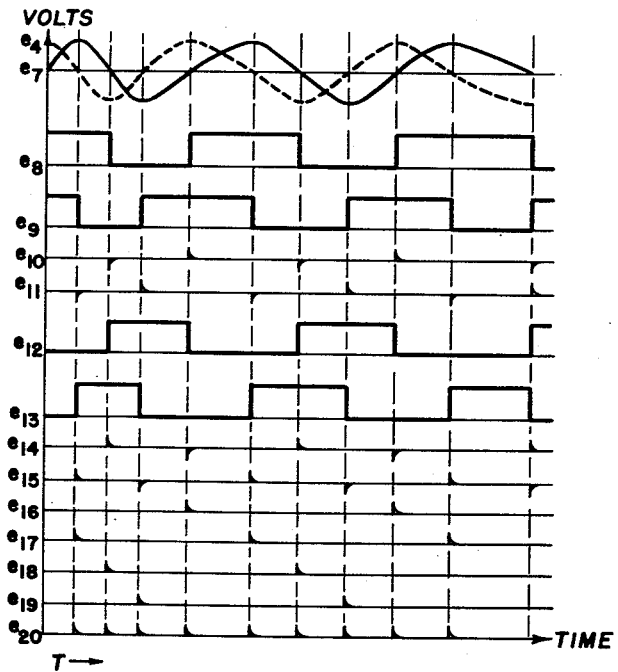
Figures 3 and 4 are a series of graphical representations of waveforms of the voltages appearing in various portions of the embodiment of this invention illustrated in Figure 1.
Figure 4:
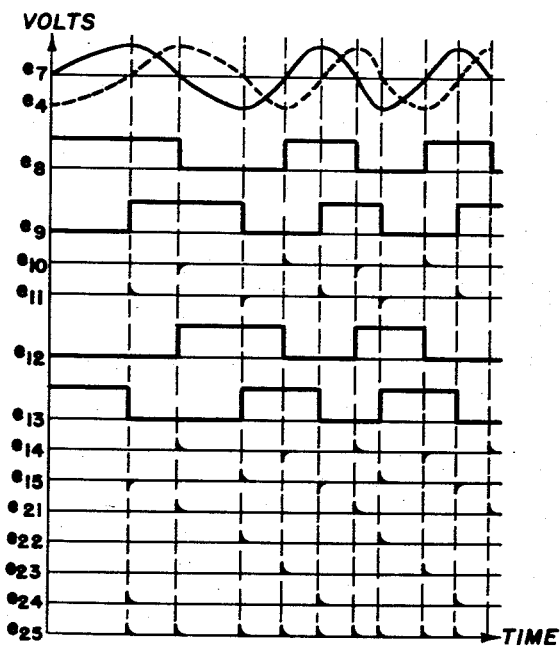

Low-pass filter 36 filters out the second term containing the sum frequency and passes only the first term containing the difference frequency. Thus, the output signal $e_4$ from low-pass filter 36 is of the form $$e_4 = \frac{E_1 E_2}{2} \cos (\omega_1 t - \omega_2 t)$$

illustrated in Figure 3 and Figure 4.

Reference voltage $e_1 = E_1 \sin \omega_1 t$ is shifted in phase 90 degrees by phase shifter 17, which may be of any suitable type, such as the type employing a reactive-resistive network, or a delay line. Conveniently, phase shifter 17 may be incorporated as an integral part of reference signal generator 14. Alternatively, signal generator 14 may be of the type furnishing two signals of identical frequency in quadrature. The quadrature signal $$e_5 = e_1 + 90 \text{ degrees} = E_1 \sin (\omega_1 t + \phi)$$

where $\phi = 90$ degrees. Therefore, $e_5 = E_1 \cos \omega_1 t$. The unknown signal, $e_2 = E_2 \sin \omega_2 t$, and $e_5$ are applied to modulator 16 substantially identical in structure and function to modulator 15. The output signal $e_6$ from modulator 16 is also the product of the two input voltages. Thus, $$e_6 = e_5 e_2 = (E_1 \cos \omega_1 t)(E_2 \sin \omega_2)$$
$$= \frac{E_1 E_2}{2}[\sin (\omega_2 t + \omega_1 t) + \sin (\omega_2 t - \omega_1 t)]$$

Low-pass filter 21, substantially identical to low-pass filter 36, filters out the first term containing the sum frequency and passes only the second term containing the difference frequency. Therefore, it will be seen that the output signal $e_7$ from low-pass filter 21 is of the form $$e_6 = \frac{E_1 E_2}{2} \sin (\omega_2 t - \omega_1 t)$$

illustrated in Figure 3 and Figure 4.

In the waveforms of Figure 3, the effect of unknown frequency signal $e_2$ is illustrated wherein $e_2$ is initially of a higher frequency than that of the reference signal $e_1$, and is decreasing toward the frequency of reference signal $e_1$. As disclosed hereinabove, the difference terms $e_4$ and $e_7$ of the complex modulated output signals are selected by low-pass filters 21 and 36. Since reference signal $e_1$ is shifted 90 degrees in phase before application to modulator 16, output signal $e_7$ from low-pass filter 21 is 90 degrees out of phase with output signal $e_4$ from low-pass filter 36. This is clearly represented in Figure 3. As will be apparent from Figure 3, the difference term of the modulator output signal decreases in frequency as unknown frequency signal $e_2$ approaches the frequency of reference signal $e_1$.

Referring back to Figure 1, it will be seen that waveform $e_4$ from low-pass filter 36 is applied to trigger circuit 37. The trigger circuit converts the varying sinusoidal output signal from low-pass filter 36 into two square waves 180 degrees out of phase. In an embodiment presently preferred, trigger circuit 37 comprises a cathode-coupled bi-stable trigger circuit of the Eccles-Jordan type. Such trigger circuits, as is well-known in the art, comprise two electron discharge devices arranged in circuit such that only one electron discharge device may be in the conducting condition at a time. A sinusoidal voltage, such as $e_4$, applied to one of said discharge devices causes the electron discharge device to alternately assume the conducting condition. A pair of output conductors, each placed in circuit with one electron discharge device, will alternately have a low potential and a high potential as the electron discharge device associated therewith alternates between the conductive and nonconductive condition. Therefore, it will be seen that each output conductor carries a square wave, 180 degrees out of phase with the square wave on the other output conductor. The square wave signal from the left half of trigger circuit 22 is illustrated as $e_8$ in Figures 3 and 4 and the square wave signal from the right half of trigger circuit 22 is illustrated as $e_{12}$. Similarly, the output signal from the left half of trigger circuit 37 is illustrated as $e_9$ in Figures 3 and 4, and the output signal from the right half of trigger circuit 37 is illustrated as $e_{13}$. It will be noted in Figures 3 and 4 that, as disclosed hereinabove, signal $e_8$ from the left half of trigger circuit 22 is in phase with $e_7$ and 180 degrees out of phase with signal $e_{12}$ from the right half thereof, and signal $e_9$ from the left half of trigger circuit 37 is in phase with waveform $e_4$ and 180 degrees out of phase with waveform $e_{13}$ from the right half of the trigger circuit. Gate circuits 25 and 26 are opened only when square wave $e_8$ is positive, gate circuits 27 and 31 are opened when square wave $e_{12}$ is positive, gate circuits 33 and 34 are opened when square wave $e_9$ is positive, and gate circuits 32 and 35 are opened when square wave $e_{13}$ is positive.

Square waves $e_8$, $e_9$, $e_{12}$ and $e_{13}$ are also applied to differentiating circuits 23, 41, 24 and 42, respectively. Such differentiators, usually comprising a shunt resistor-series capacitor differentiating network, are well-known to the art. The positive-going section of a square wave applied to such differentiating circuits provides a positive polarity output impulse, and the negative-going portion of the square wave generates a negative polarity output impulse therefrom. Output impulse train $e_{10}$ is, therefore, provided by differentiator 23, impulse train $e_{11}$ by differentiator 41, impulse train $e_{14}$ by differentiator 24, and impulse train $e_{15}$ is provided by differentiator 42.

Coincidence, or "and," gates 25, 26, 27, 31, 32, 33, 34, and 35 are of a type well-known to those skilled in the art. Such coincidence, or "and" gates, furnishing an output impulse only when both of the two input conductors thereto are actuated by a positive potential, may be of any suitable type, such as those including a diode or triode electron discharge device, a semi-conductor device, or a relay circuit. Semi-conductor diode devices are employed in a presently preferred embodiment of this invention. Such gate circuits are described on pages 214–224 of "The Design of Switching Circuits," written by W. Keister, A. E. Ritchie, and S. H. Washburn, and published in 1951 by D. Van Nostrand Company, Inc.

An output impulse is produced by an "and" gate only when a positive portion of the square wave output from the trigger circuit associated therewith and a positive impulse from the differentiator connected thereto are applied simultaneously to the gate. Thus, output impulses from "and" gate 33, illustrated as waveform $e_{16}$ in Figure 3, are obtained only when a positive polarity impulse is impressed by the impulse train generated by differentiator 23, illustrated as $e_{10}$ in Figure 3, simultaneously with the positive polarity portion of the square wave from the left half of trigger circuit 37, illustrated as $e_9$ in Figure 3. Thus, the gate is opened by the positive portion of the square wave, allowing the positive polarity impulse from the discriminator coincident therewith to pass through the gate.

Output impulse trains $e_{16}$, $e_{17}$, $e_{18}$ and $e_{19}$ from gates 33, 26, 35 and 31, respectively, are combined into a single impulse train $e_{20}$, and applied to output device 43. Similarly, impulse trains $e_{21}$, $e_{22}$, $e_{23}$ and $e_{24}$, from gates 34, 27, 32 and 25, respectively, are combined to form impulse train $e_{25}$, and applied to output device 43. In a preferred embodiment of this invention, output device 43 is a bidirectional counter, counting pulse train $e_{20}$ in a positive direction and pulse train $e_{25}$ in a negative direction. Thus, if test signal $e_2$ is of higher frequency than reference signal $e_1$, output device 43 counts the number of impulses in impulse train $e_{20}$. As disclosed hereinabove, each impulse counted represents a quarter of a cycle difference between the two signals. Similarly, if test signal $e_2$ is of lower frequency than reference signal $e_1$, output device 43 counts the number of impulses in impulse train $e_{25}$ in the negative direction. Thus, the frequency of test signal $e_2$ may be adjusted to maintain a zero count in output levice 43, either manually by referring to a visual indication, or automatically by means of a suitable servo system, thereby maintaining the frequency of test signal $e_2$ within a quarter of a cycle of the frequency of reference signal $e_1$. Other output devices are contemplated in connection with this invention. Exemplarily, means for averaging the current provided by the output impulse trains, such as a suitably calibrated zero center D'Arsonval meter, will provide a numerical indication of the frequency difference between the test signal and the reference with a precision of a quarter of a cycle.

Figure 3, taken in connection with Figure 1, illustrates the mode of operation of this invention when test signal $e_2$ is initially of higher frequency than reference signal $e_1$, and is decreasing toward the refence frequency. Reference frequency $e_1$ is combined directly with test signal $e_2$ in modulator 15. As disclosed hereinabove, the difference term $e_4$, illustrated by the dashed line in Figure 3, is selected by low pass filter 36. In a similar manner, test signal $e_2$ is combined with $e_5$, which is reference signal $e_1$ shifted in phase by 90 degrees, in modulator 16. Difference frequency term $e_7$ is selected by low-pass filter 21. Sinusoidal waveforms $e_4$ and $e_7$ are converted into square waves $e_9$ and $e_8$, respectively, of like phase, and square waves $e_{13}$ and $e_{12}$, respectively, 180 degrees out of phase, by trigger circuits 22 and 37. Square waves $e_8$, $e_9$, $e_{12}$ and $e_{13}$ are differentiated by differentiators 23, 41, 24, and 42, respectively, resulting in impulse trains $e_{10}$, $e_{11}$, $e_{14}$ and $e_{15}$ respectively. The positive portion of square wave $e_8$, from the left half of trigger circuit 22, opens "and" gates 25 and 26. "And" gate 25 is also connected to differentiator 41, receiving impulse train $e_{11}$ therefrom. However, it will be seen that no positive impulse in impulse train $e_{11}$ coincides in time with a positive portion of square wave $e_8$. Thus, no output impulse is obtained from "and" gate 25. On the other hand, "and gate 26 receives, in addition to square wave $e_8$, impulse train $e_{15}$ from differentiator 42. As will be apparent from Figure 3, the positive polarity impulses of $e_{15}$ coincide with the positive portion of square wave $e_8$, and, therefore, "and" gate 26 transmits output impulse train $e_{17}$.

The positive portion of square wave $e_{12}$, from the right half of trigger circuit 22, opens "and" gates 27 and 31. Impulse train $e_{15}$ from differentiator 42 is applied to "and" gate 27, and impulse train $e_{11}$ from differentiator 41 is applied to "and" gate 31. As is apparent from Figure 3, the positive impulses of impulse train $e_{15}$ do not coincide with the positive portion of square wave $e_{12}$, and, therefore, no output impulse is obtained from "and" gate 27. However, on the other hand, the positive impulses of impulse train $e_{11}$ are coincident in time with the positive portion of square wave $e_{12}$, and output impulse train $e_{19}$ is obtained from "and" gate 31.

In a similar manner, the positive portions of square waves $e_9$ and $e_{13}$ open gates 33 and 35, enabling coincident positive impulses from impulse trains $e_{10}$ and $e_{14}$ to be passed as impulse trains $e_{16}$ and $e_{18}$. Gates 34 and 32, also opened by square waves $e_9$ and $e_{13}$, do not pass any output impulses when the frequency of test signal $e_2$ is higher than the frequency of reference signal $e_1$. Output impulse trains $e_{16}$, $e_{17}$, $e_{18}$ and $e_{19}$, from gates 33, 26, 35 and 31, are combined to form impulse train $e_{20}$, which is applied to drive output device 43 in the direction indicating that the frequency of $e_2$ is higher than that of $e_1$.

The waveform diagrams of Figure 4, taken with the block diagram of Figure 1, illustrate the mode of operation of this invention when the frequency of test signal $e_2$ is lower than the frequency of reference signal $e_1$, the frequency difference progressively increasing. Phase shifter 17, modulators 15 and 16, low-pass filters 36 and 21, trigger circuits 37 and 22, and differentiators 41, 42, 23 and 24 operate in a manner substantially identical to that described hereinabove in connection with Figure 3. However, the time relationships of the square waves $e_9$ and $e_{13}$ from trigger circuit 37 and the square waves $e_8$ and $e_{12}$ from trigger circuit 22 with respect to the positive impulses in impulse trains $e_{11}$, $e_{15}$, $e_{10}$ and $e_{14}$ from differentiators 41, 42, 23 and 24 is such that positive impulses coincide with positive portions of the square wave only at "and" gates 34, 27, 32 and 25, resulting in output impulse trains $e_{21}$, $e_{22}$, $e_{23}$ and $e_{24}$, respectively, as illustrated by Figure 4. Impulse train $e_{25}$ combines the output impulse trains $e_{21}$, $e_{22}$, $e_{23}$ and $e_{24}$, and is applied to output device 43 in the opposite sense from impulse train $e_{20}$.

It will be seen, therefore, that output device 43 indicates the sense and the amount of deviation of the frequency of $e_2$ with respect to the frequency of reference signal $e_1$. In addition, a bidirectional counter employed as an output device will indicate the accumulated frequency deviation within a quarter of a cycle. Furthermore, with the incorporation in output device 43 of means for conversion of the numerical count to a voltage proportional thereto, a suitable frequency control device may be employed to control the frequency of the test signal within a quarter cycle of the frequency of the reference signal. Such digital-to-analog converters, well-known to the art, provide a direct voltage having a magnitude proportional to the digital count. An automatic frequency control arrangement as disclosed hereinabove provides a proportional feedback servo system which will not only maintain the frequency of the test signal at a desired relationship to the reference, but will maintain the number of cycles of the test signal at a desired relationship to the number of cycles from the reference signal source 14.

While certain preferred embodiments of the invention have been specifically disclosed, it is understood that the invention is not limited thereto as many variations will be readily apparent to those skilled in the art and the invention is to be given its broadest possible interpretation within the terms of the following claims.

We claim:

1. In an electrical measuring circuit, a first alternating voltage source of one frequency, a second alternating voltage source of a frequency to be compared with the first frequency, first and second modulators, means for connecting in circuit the output of said second alternating voltage source directly to said first and second modulators, a phase shifter, means for connecting in circuit a portion of the output of said first alternating voltage source through said phase shifter to said second modulator, means for connecting in circuit another portion of the output of said first alternating voltage source directly to said first modulator, first and second low-pass filters respectively coupled to said first and second modulators for passing selected signals from said modulators, first and second trigger circuits connected in circuit respectively to said first and second low-pass filters for converting each of said selected signals into a pair of square waves of like frequency in phase opposition, first and second differentiators connected in circuit with said first trigger circuit and third and fourth differentiators connected in circuit with said second trigger circuit for translating said square waves into impulses, a plurality of coincidence gates, means for connecting each of said coincidence gates to a predetermined trigger circuit and a predetermined differentiator whereby each of said coincidence gates is responsive to a square wave from a selected trigger circuit in conjunction with an impulse from a selected differentiator, and output means connected to said gate circuits.

2. In an electrical measuring circuit, means for connecting in circuit a first alternating voltage of one frequency, means for connecting in circuit a second alternating voltage of a frequency to be compared with the first frequency, a first channel connected in circuit with said first and second named means for developing a first signal representing the difference modulation term of said first and second alternating voltages, a second channel connected in circuit with said first and second named means including phase shifting means operatively associated with said first alternating voltage for developing a second signal representing the difference modulation term of the phase shifted first alternating voltage and said second alternating voltage, first and second trigger circuits connected in circuit respectively to said first and second channels for converting each of said first and second signals into a pair of square waves of like frequency in phase opposition, first and second differentiators connected in circuit with said first trigger circuit and third and fourth differentiators connected in circuit with said second trigger circuit for translating said square waves into impulses, a plurality of coincidence gates, means for connecting each of said coincidence gates to a predetermined trigger circuit and a predetermined differentiator whereby each of said coincidence gates is responsive to a square wave from a selected trigger circuit and a coincident impulse from a selected differentiator, and output means connected to said gate circuits.

3. In an electrical measuring circuit, a first alternating voltage source of one frequency, a second alternating voltage source of a frequency to be compared with the first frequency, first and second modulators, means for connecting in circuit the output of said second alternating voltage source directly to said first and second modulators, a phase shifter, means for connecting in circuit a portion of the output of said first alternating voltage source through said phase shifter to said second modulator, means for connecting in circuit another portion of the output of said first alternating voltage source directly to said first modulator, first and second low-pass filters respectively coupled to said first and second modulators for passing selected signals from said modulators, first and second trigger circuits connected in circuit respectively to said first and second low-pass filters for converting each of said selected signals into a pair of square waves of like frequency in phase opposition, first and second differentiators connected in circuit with said first trigger circuit and third and fourth differentiators connected in circuit with said second trigger circuit for translating said square waves into impulses, a first plurality of coincidence gates, a second plurality of coincidence gates, means for connecting each of said coincidence gates in circuit with a predetermined trigger circuit and a predetermined differentiator for producing an output impulse in response to a square wave from a selected trigger circuit and a coincident impulse from a selected differentiator, and a bidirectional counter connected to said first and second plurality of coincidence gates.

4. In an electrical measuring circuit, means for connecting in circuit a first alternating voltage of one frequency, means for connecting in circuit a second alternating voltage of a frequency to be compared with the first frequency, a first channel for delevoping a first signal representing the difference modulation term of said first and second alternating voltages, a second channel including phase shifting means connected in circuit with said first alternating voltage for developing a second signal representing the difference modulation term of the phase shifted first alternating voltage and said second alternating voltage, first and second trigger circuits connected in circuit respectively to said first and second channels for converting each of said first and second signals into a pair of square waves of like frequency in phase opposition, first and second differentiators connected in circuit with said first trigger circuit and third and fourth differentiators connected in circuit with said second trigger circuit for translating said square waves into impulses, a first plurality of coincidence gates, a second plurality of coincidence gates, means for connecting each of said coincidence gates in circuit with a predetermined trigger circuit and a predetermined differentiator for producing an output impulse in response to a square wave from a selected trigger circuit and a coincident impulse from a selected differentiator, and output means connected to said first and second plurality of coincidence gates.

5. In an electrical measuring circuit, means for applying a first alternating voltage of one frequency, means for applying a second alternating voltage of a frequency to be compared with the first frequency, a first channel for developing a first signal representing the difference modulation term of said first and second alternating voltages, a second channel including phase shifting means operatively associated with said first alternating voltage for developing a second signal representing the difference modulation term of the phase shifted first alternating voltage and said second alternating voltage, first and second trigger circuits responsive respectively to said first and second channels for converting each of said first and second signals into a pair of square waves of like frequency in phase opposition, first and second differentiators associated with said first trigger circuit and third and fourth differentiators associated with said second trigger circuit for translating said square waves into impulses, a first plurality of gate circuits including a first gate responsive to said first trigger circuit and said third differentiator, a second gate responsive to said second trigger circuit and said second differentiator, a third gate responsive to said first trigger circuit and said fourth differentiator and a fourth gate responsive to said second trigger circuit and said first differentiator, a second plurality of gate circuits including a fifth gate responsive to said first trigger circuit and said fourth differentiator, a sixth gate responsive to said second trigger circuit and said second differentiator, a seventh gate responsive to said first trigger circuit and said third differentiator and an eighth gate responsive to said second trigger circuit and said first differentiator, a bidirectional impulse counter having first and second input terminals, means connecting said first plurality of gates to said first input terminal and means connecting said second plurality of gates to said second input terminal.

6. In an electrical measuring circuit, a first alternating voltage source of one frequency, a second alternating voltage source of a frequency to be compared with the first frequency, first and second modulators, means for applying the output of said second alternating voltage source directly to said first and second modulators, a phase shifter, means for applying a portion of the output of said first alternating voltage source through said phase shifter to said second modulator, means for applying another portion of the output of said first alternating voltage source directly to said first modulator, first and second low-pass filters respectively coupled to said first and second modulators for passing selected signals from said modulators, first and second trigger circuits responsive respectively to said first and second low-pass filters for converting each of said selected signals into a pair of square waves of like frequency in phase opposition, first and second differentiators associated with said first trigger ciruit and third and fourth differentiators associated with said second trigger circuit for translating said square waves into impulses, a first plurality of gate circuits including a first gate responsive to said first trigger circuit and said third differentiator, a second gate responsive to said second trigger circuit and said second differentiator, a third gas responsive to said first trigger circuit and said fourth differentiator and a fourth gate responsive to said second trigger circuit and said first differentiator, a second plurality of gate circuits including a fifth gate responsive to said first trigger circuit and said fourth differentiator, a sixth gate responsive to said second trigger circuit and said second differentiator, a seventh gate responsive to said first trigger circuit and said third differentiator and an eighth gate responsive to said second trigger circuit and said first differentiator, a bidirectional impulse counter having first and second input terminals, means connecting said first plurality of gates to said first input terminal and means connecting said second plurality of gates to said second input terminal.

References Cited in the file of this patent

UNITED STATES PATENTS

| | | |
|---|---|---|
| 2,452,960 | Smith | Nov. 2, 1948 |
| 2,474,253 | Jacobsen | June 28, 1949 |
| 2,543,058 | Ranger | Feb. 27, 1951 |
| 2,595,263 | Ingalls | May 6, 1952 |
| 2,615,127 | Edwards | Oct. 21, 1952 |
| 2,677,104 | Chase | Apr. 27, 1954 |
| 2,731,566 | Chalhoub | Jan. 17, 1956 |
| 2,762,949 | Huffman | Sept. 11, 1956 |
| 2,767,312 | Toulon | Oct. 16, 1956 |
| 2,858,425 | Gordon | Oct. 28, 1958 |